(No Model.)
N. G. McINTYRE.
ADJUSTABLE TUBE EXPANDER.
No. 268,918. Patented Dec. 12, 1882.
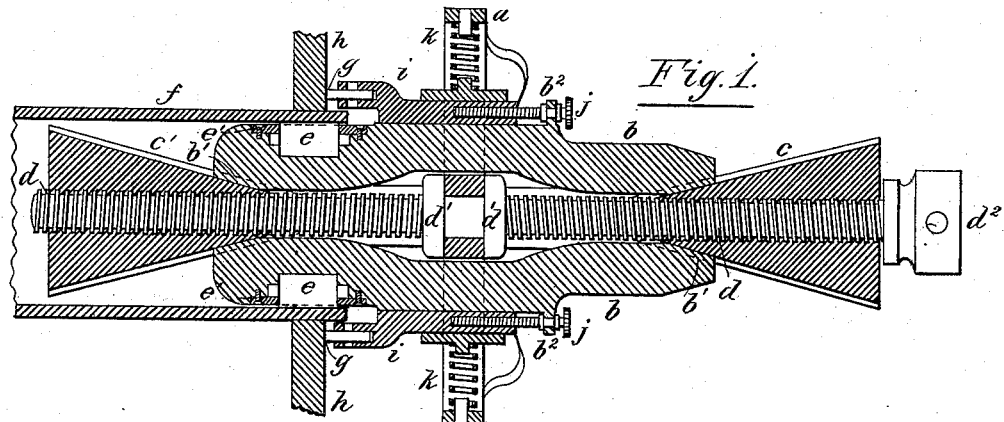
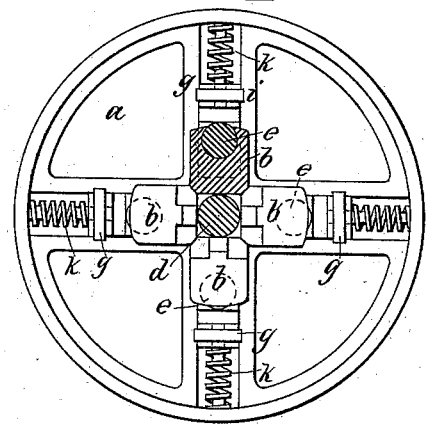
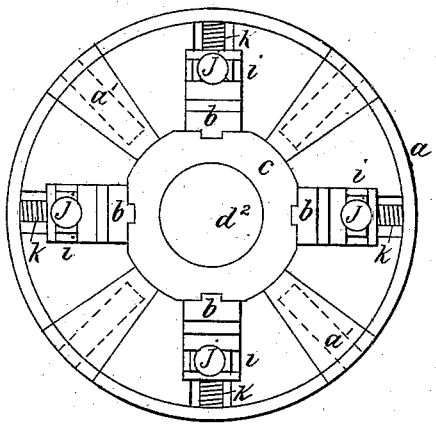
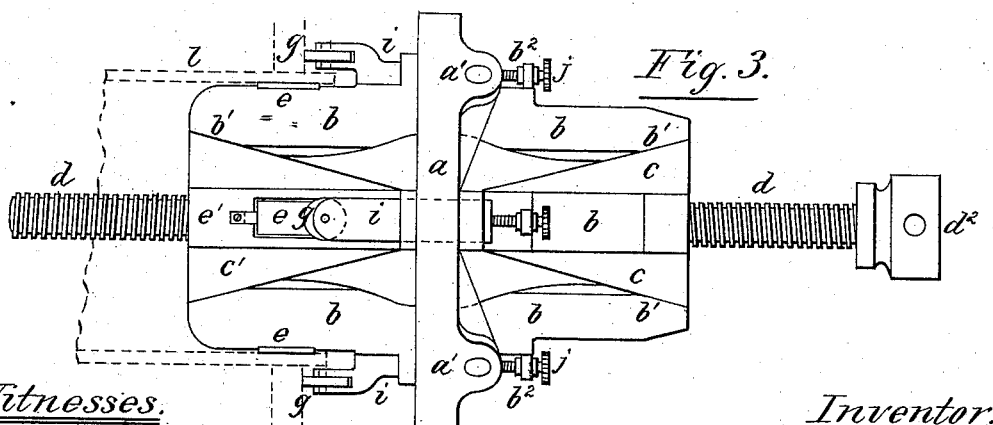
Witnesses.
H. L. Williams
E. G. Baker.
Inventor.
Neil G. McIntyre
per Alfred Theoloch
Atty.

UNITED STATES PATENT OFFICE.

NEIL G. McINTYRE, OF BROOKLYN, NEW YORK, ASSIGNOR OF SEVEN-EIGHTHS TO WARREN W. SHEPPARD, JESSIE McINTYRE, CATHARINA HERBST, AND ROBINA R. HEDGES, ALL OF SAME PLACE.

ADJUSTABLE TUBE-EXPANDER.

SPECIFICATION forming part of Letters Patent No. 268,918, dated December 12, 1882.

Application filed March 27, 1882. (No model.)

*To all whom it may concern:*

Be it known that I, NEIL G. MCINTYRE, of Brooklyn, county of Kings, State of New York, have invented a certain new and useful Improved Adjustable Tube-Expander, of which the following is a specification.

This invention relates to that class of implements employed for expanding the ends of boiler-tubes in the holes in the tube-sheets, which as heretofore made have been adapted to expand only one size of tube, necessitating the employment of a separate implement for each size of tube.

This invention has for its object to make such implements universal in their application, or so adjustable that a great number of different size tubes may be properly expanded to make a tight joint between the tubes and the tube-sheet of boilers by means of one implement; and to accomplish this desirable result I utilize the power obtained by the combination of the screw and inclined plane in forcing expanding-rollers carried by jaws outward against the inside of the tube to be expanded, said jaws being held at their central parts in radial slots formed in a disk or plate, which also retains a screw-shaft having a right and left thread in position, which carries two nuts provided with inclined faces adapted to slide over correspondingly-inclined faces on the ends of the jaws, and thereby force the jaws outward when the screw-shaft is rotated to draw the two nuts toward the holding disk or plate, and when the expanding-rollers on the jaws are forced against the inside of the tube the whole implement is rotated by means of a rod placed in socket-holes formed in the edge of the disk, thereby rolling the end of the tube outward in close contact with the tube-sheet. The jaws are held against the nuts by means of springs, and they are each provided with an adjustable sliding block having a roller adapted to bear against the front of the tube-sheet around the projecting end of the tube as a guide to steady the implement, and to adjust the expanding-rollers in proper position to act on the part of the tube directly within the hole of the tube-sheet.

To describe my invention more particularly, I will refer to the accompanying drawings, forming part of this specification, in which—

Figure 1 represents a longitudinal sectional view of one of my improved tube-expanders adjusted to expand the smaller size tube it is adapted to operate on. Fig. 2 is an end view of the same, showing one of the expanding-rollers in section and the wedge-shape nut removed. Fig. 3 is a side elevation of the implement with the jaws expanded out to their full extent, and Fig. 4 is an end view of the same.

The disk or plate $a$ is provided with radial slots, in which are fitted to slide, in radial direction only the jaws $b$ $b$. The ends of these jaws $b$ $b$, at their inner sides, have inclined surfaces $b'$ $b'$, against which fit the wedge-shaped nuts $c$ $c'$, the one, $c$, having a right-hand screw-thread formed through it, and the other, $c'$, a left-hand screw-thread. Through these nuts $c$ $c'$ and the center of the disk or plate $a$ is located the right and left hand screw-shaft $d$, the same being held firmly to the plate $a$, as regards longitudinal movement, by means of the collars $d'$ $d'$. One end of the screw-shaft $d$ is provided with a head, $d^2$, by means of which it may be rotated to move the wedge-shaped nuts $c$ $c'$ to or from the plate $a$; and to insure the nuts from rotating with the screw $d$, I propose to groove their inclined faces and form ribs on the inclined faces of the jaws to fit therein, as shown. Near one end of the jaws $b$ $b$ recesses are formed, in which are placed the expanding-rollers $e$ $e$, the outer sides of which project above the jaws, so that they only come in contact with the tube $f$, Fig. 1, and these rollers are retained in the recesses in the jaw by means of the small retention-plates $e'$ $e'$, let into the jaws to extend over small trunnions formed on the ends of the rollers $e$ $e$.

To hold the implement in place while in use the guide-rollers $g$ $g$ are provided, which bear against the face of the tube-sheet $h$, as shown in Fig. 1. These rollers may be pivoted in projecting pieces on the jaws $b$ $b$, so as to retain a fixed position in relation to the expanding-rollers $e$ $e$; but I prefer to make them adjustable, so that when they bear against the tube-sheet $h$ the said tube-sheet will be directly over the center of the rollers $e\ e$, whatever thickness the tube-sheet may have. As shown, these guide-rollers $g\ g$ are pivoted in the ends of the sliding blocks $i\ i$, which pass through a longitudinal opening formed in the outer central parts of the jaws $b\ b$. The adjusting-screws $j\ j$ screw into the ends of the blocks $i\ i$, and are held so as to have no end movement in relation to the jaws $b\ b$ in the lugs $b^2$, forming part of the jaws. By turning these screws $j\ j$ the edge of the rollers $g\ g$ may be set in any desired position in relation to the rollers $e\ e$. The jaws $b\ b$ are contracted together (as the wedge-nuts $c\ c'$ are moved out) by means of the springs $k\ k$, located between their central parts and the outer boundary of the radial slots in the plate $a$. Any number of jaws with their expanding rollers may be used. I have shown four in the drawings. Three in all ordinary cases will be all that is necessary, and may be more efficient than four; but I do not wish to confine myself to any particular number.

In operating the implement on any size tube it is adapted to expand the jaws are contracted so that the rollers $e\ e$ will just pass into the end of the tube, when they are forced out against the inside of the tube-sheet by rotating the screw-shaft $d$, and the whole rotated by means of any suitable rod or rods being placed in the socket-holes $a'\ a'$, cast or formed in the plate $a$, thereby causing the rollers $e\ e$, by a rolling action, to press the tube against the edge of the hole in the tube-plate, the pressure of the rollers against the tube to be increased as the operation progresses, as desired, by manipulating the screw $d$.

It will be observed that a great number of sizes of tubes may be expanded by means of one implement, constructed as described and shown, as indicated between the size tube shown at $f$, Fig. 1, and the size tube shown in dotted lines $l$, Fig. 3; and although said implement has considerable range of action, the power to expand tubes is ample, by reason of the combination of the double screw-shaft and wedge-shaped nuts with the radially-moving jaws.

The rollers $e\ e$, instead of being cylindrical in form, may be shaped to form beads in the tube on either side of the tube-sheet.

Having now described my invention, what I claim, and desire to secure by Letters Patent, is—

1. In combination, the jaws $b\ b$, provided with the rollers $e\ e$, the radial slotted plate $a$, wedge-shaped nuts $c\ c'$, and screw $d$, substantially as set forth.

2. The combination, with the jaws $b\ b$, provided with the rollers $e\ e$, and adapted to be forced outwardly by means substantially as described, of the adjustable guide-rollers $g\ g$, as and for the purpose set forth.

3. In combination, the jaws $b\ b$, the rollers $e\ e$, radial slotted plate $a$, springs $k\ k$, wedge-shaped nuts $c\ c$, and double screw-shaft $d$, substantially as set forth.

4. In combination, the double screw-shaft $d$, wedge-shaped nuts $c\ c'$, jaws $b\ b$, provided with the expanding-rollers $e\ e$, and the guide-rollers $g\ g$, substantially as and for the purpose set forth.

In witness whereof I have hereunto set my hand at New York, county and State of New York, this 24th day of March, A. D. 1882.

NEIL G. McINTYRE.

In presence of—
H. D. WILLIAMS,
E. G. BAKER.